United States Patent [19]
Toogood et al.

[11] Patent Number: 5,377,717
[45] Date of Patent: Jan. 3, 1995

[54] HYDRAULIC FLOW CONTROL VALVE ASSEMBLIES

[75] Inventors: Graham J. Toogood, Cheltenham; Michael S. Barnes, Springbank, both of England

[73] Assignee: Ultra Hydraulics Limited, Staverton, England

[21] Appl. No.: 212,995

[22] Filed: Mar. 15, 1994

[30] Foreign Application Priority Data

Mar. 24, 1993 [GB] United Kingdom ............... 9306131

[51] Int. Cl.$^6$ ............................................. G05D 11/03
[52] U.S. Cl. ................................... 137/101; 137/118
[58] Field of Search ................ 137/101, 117, 118, 119

[56] References Cited

U.S. PATENT DOCUMENTS

| | | | |
|---|---|---|---|
| 3,334,705 | 8/1967 | Lam | 137/118 |
| 3,642,019 | 2/1972 | Kramer | 137/117 X |
| 3,939,859 | 2/1976 | Ueda et al. | 137/118 |
| 4,332,270 | 6/1982 | Budecker | 137/118 X |

FOREIGN PATENT DOCUMENTS

| | | | |
|---|---|---|---|
| 3137438 | 3/1983 | Germany | 137/118 |
| 2104016 | 3/1983 | United Kingdom . | |
| 2238355 | 5/1991 | United Kingdom . | |

*Primary Examiner*—Stephen M. Hepperle
*Attorney, Agent, or Firm*—Young & Thompson

[57] ABSTRACT

A hydraulic flow control valve assembly comprises an inlet port for input fluid flow from a pump, a first outlet port for output fluid flow to a power steering unit, a second-outlet port for output fluid flow to an accumulator of a braking system, and an excess flow port for output fluid flow to other services or a tank. A flow control valve controls the fluid flow from the inlet port to the outlet ports and the excess flow port, and a load sensing port communicates a load-dependent pressure signal from the power steering unit to the valve so as to provide priority fluid flow to the power steering unit. A pilot valve is provided for cutting off the load-dependent pressure signal when the pressure within the accumulator falls below a predetermined value so as to provide for fluid flow from the valve to the accumulator, and in addition a pressure difference sensing arrangement communicates the pressure difference across a restrictor to the valve so as to provide fluid flow to the accumulator. This assembly permits priority flow from the pump to a power steering unit, as well as providing for fluid flow to the accumulator, as necessary, and providing excess flow as available to a third device.

10 Claims, 3 Drawing Sheets

HYDRAULIC FLOW CONTROL VALVE ASSEMBLIES

This invention relates to hydraulic flow control valve assemblies, and is concerned more particularly, but not exclusively, with hydraulic flow control valve assemblies for supply of hydraulic fluid to vehicle power steering and accumulator charging systems.

A flow control valve is known which provides a priority flow from a pump to a fluid pressure actuated device, such as the power steering system of a forklift truck, as well as an excess flow for supplying further fluid pressure actuated devices, such as the hydraulic lifting ram of such a forklift truck, when the whole of the pump flow is not required for the priority flow. The flow control valve may be controlled in dependence on the load on the steering system so that just sufficient flow is supplied to the steering system. Such a flow control valve is disclosed in GB 2238355A.

Furthermore a flow control valve is known which provides a priority flow to charge an accumulator, such as is used in the braking system of a forklift truck, as well as an excess flow for supplying further fluid pressure actuated devices. The flow control valve may be controlled so as to charge the accumulator at a preset rate when the pressure within the accumulator drops below a predetermined value.

Where a single fixed displacement pump is to be used both for supplying a power steering system and for charging an accumulator, as well as for supplying other services, it is necessary for these two flow control valves to be connected in series, the first valve giving priority to steering and the excess flow being passed to the second valve, and the second valve giving priority to accumulator charging. Any excess flow from the second valve can be directed either to a tank or to services. However the use of two control valves connected in series is disadvantageous in that the complete valve assembly is bulky and expensive, as well as being inefficient since there is a pressure drop across each valve.

It is an object of the invention to provide a novel flow control valve assembly capable of performing the functions of both such valves.

According to the present invention there is provided a hydraulic flow control valve assembly comprising an inlet port for input fluid flow from a pump, a first outlet port for output fluid flow to a first fluid pressure actuated device, a second outlet port for output fluid flow to a second fluid pressure actuated device, an excess flow port for output fluid flow to at least one further fluid device, flow control means for controlling the fluid flow from the inlet port to the outlet ports and the excess flow port, a load sensing port for communicating a load-dependent pressure signal from the first device to the flow control means to control the flow control means so as to provide priority fluid flow to the first device, switching means for cutting off said load-dependent pressure signal from the flow control means when the pressure within the second device falls below a predetermined value so as to provide for fluid flow from the flow control means to the second device, and pressure difference sensing means for communicating the pressure difference across a restrictor, due to flow of fluid through the restrictor when fluid flow from the flow control means to the second device takes place, to the flow control means to control the flow control means so as to provide fluid flow to the second device.

Such an assembly permits priority flow from a pump to a first device, such as a power steering unit, as well as providing for fluid flow to a second device, such as an accumulator, as necessary, and providing excess flow as available to a third device. The assembly may be produced at reasonable cost and may be made particularly compact, as well as efficient in terms of pressure losses.

Preferably the pressure difference sensing means is adapted to control the flow control means so as to allow for fluid flow to the first device as required when said load-dependent pressure signal is cut off from the flow control means by the switching means.

The valve assembly may be formed as an integral part of a pump, such as a gear pump.

Preferably the flow control means comprises a spool valve having a valve member which is biased towards a priority flow position by a spring.

The pressure difference sensing means may comprise a pressure sensing line for transmitting a pressure signal from downstream of the restrictor to one side of the spool valve member and a further pressure sensing line for transmitting a pressure signal from upstream of the restrictor to the other side of the spool valve member.

Furthermore the switching means preferably comprises a pilot valve having a valve member which is adapted to selectively open and close a load sensing line connecting the load sensing port to the flow control means. The valve member may be biased towards a closed position by a spring and may be adapted to be moved to an open position against the action of the spring when the pressure within the second device exceeds a preset value. Preferably the pilot valve is adapted to open when the pressure within the second device is at a first value and to close when the pressure within the second device is at a second value greater than the first value.

The pressure difference sensing means may include a check valve intermediate the restrictor and the second outlet port in order to prevent fluid flow from the second device towards the restrictor. If necessary a filter may be provided intermediate the restrictor and the flow control means.

The pilot valve and the check valve, and optionally also the filter, may be provided within a common housing.

In order that the invention may be more fully understood, a preferred embodiment of flow control valve in accordance with the invention will now be described, by way of example, with reference to the accompanying drawings, in which.

Figure 1:
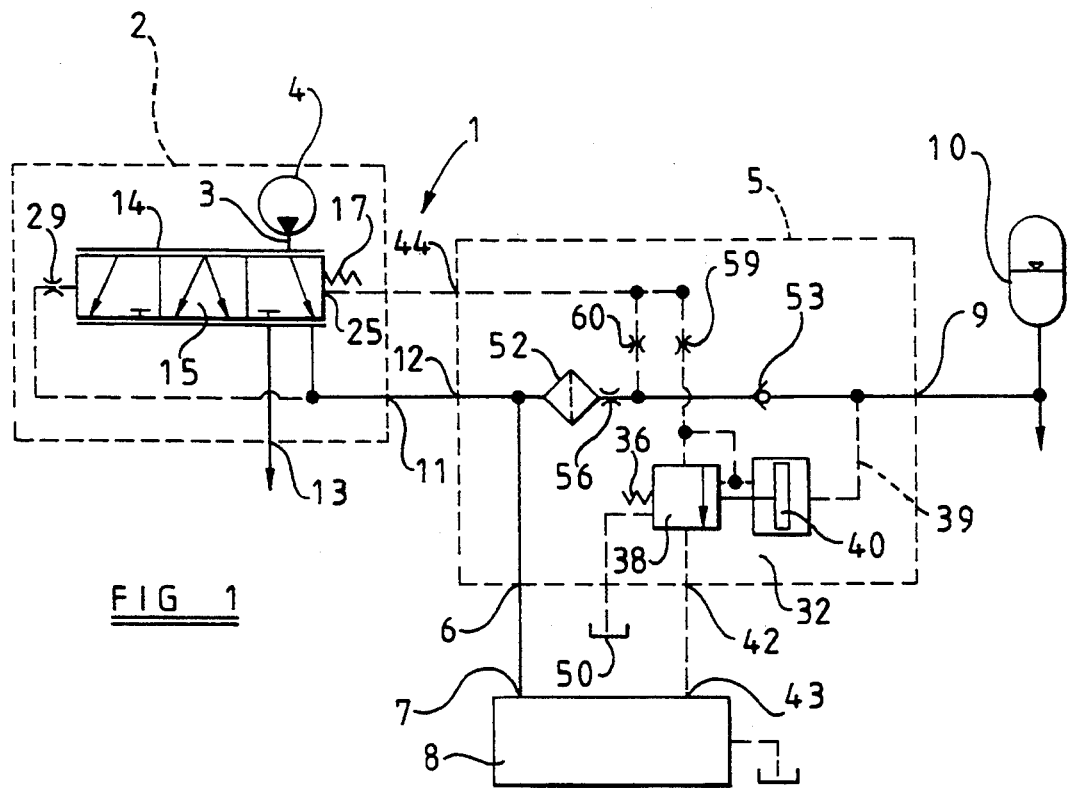
FIG. 1 is a schematic flow diagram of the valve assembly.

Referring to the schematic flow diagram of FIG. 1, the valve assembly 1 comprises a flow control portion 2 having an inlet port 3 connected to a variable pump 4, such as a gear pump, and a switching portion 5 having a first outlet port 6 for output of fluid to the inlet port 7 of a power steering unit 8 and a second outlet port 9 for output of fluid to an accumulator 10 of a braking system. In addition the flow control portion 2 has a priority outlet port 11 connected to an inlet port 12 of the switching portion 5, and an excess flow port 13 for supply of excess fluid to other services or a tank.

Figure 2:
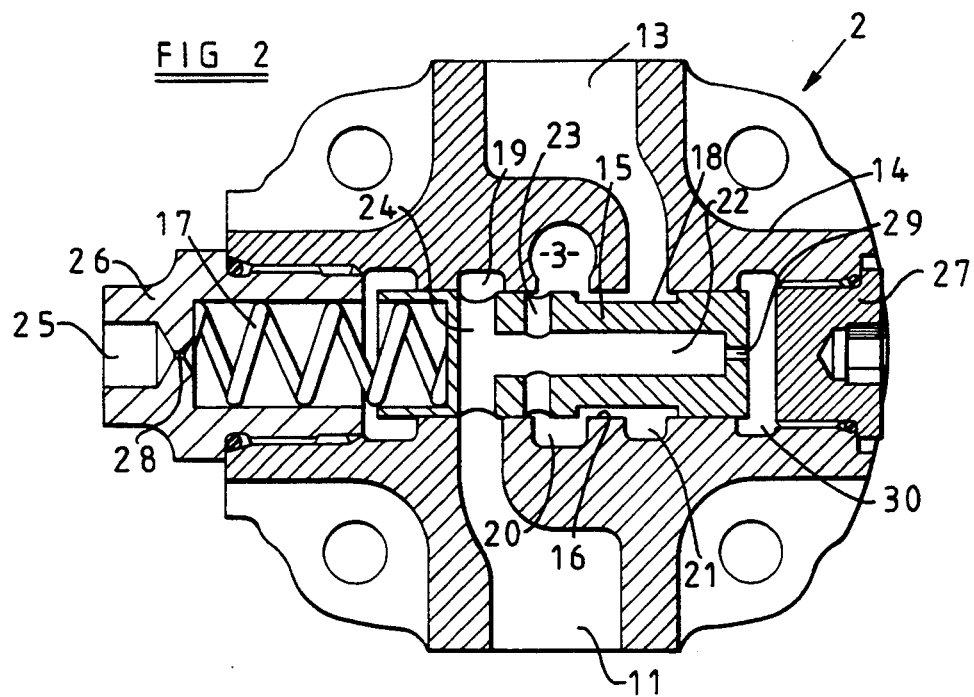
FIG. 2 is a longitudinal section through a flow control portion of the valve assembly.

The flow control portion 2 comprises a spool valve 14 the construction of which will be better appreciated by referring to FIG. 2. The valve 14 comprises a valve member 15 slidable within a bore 16 and biased to the right, as seen in FIG. 2, by a spring 17. The valve member 15 has an annular recess 18, and the bore 16 has three annular grooves 19, 20 and 21. The groove 20 communicates with the inlet port 3, the groove 19 communicates with the priority outlet port 11, and the groove 21 communicates with the excess flow port 13. Furthermore the valve member 15 has an axial passage 22 and radial passages 23 and 24 providing communication between the inlet port 3 and the priority outlet port 11 when the valve member 15 is in the position shown. The annular recess 18 in the valve member provides communication between the inlet port 3 and the excess flow port 13 to an extent determined by the axial positioning of the valve member 15.

A load sensing port 25 is provided in a nipple 26 which is threadably engaged in one end of the bore 16, and the other end of the bore 16 is closed by a screwthreaded plug 27. Fluid pressure applied to the load sensing port 25 acts by way of a narrow axial passage 28 on the left hand end of the valve member 15 as viewed in FIG. 2, whereas the pressure within the axial passage 22 in the valve member 15 acts by way of a narrow axial passage 29 and an end chamber 30 on the right hand end of the valve member 15.

Figure 3:
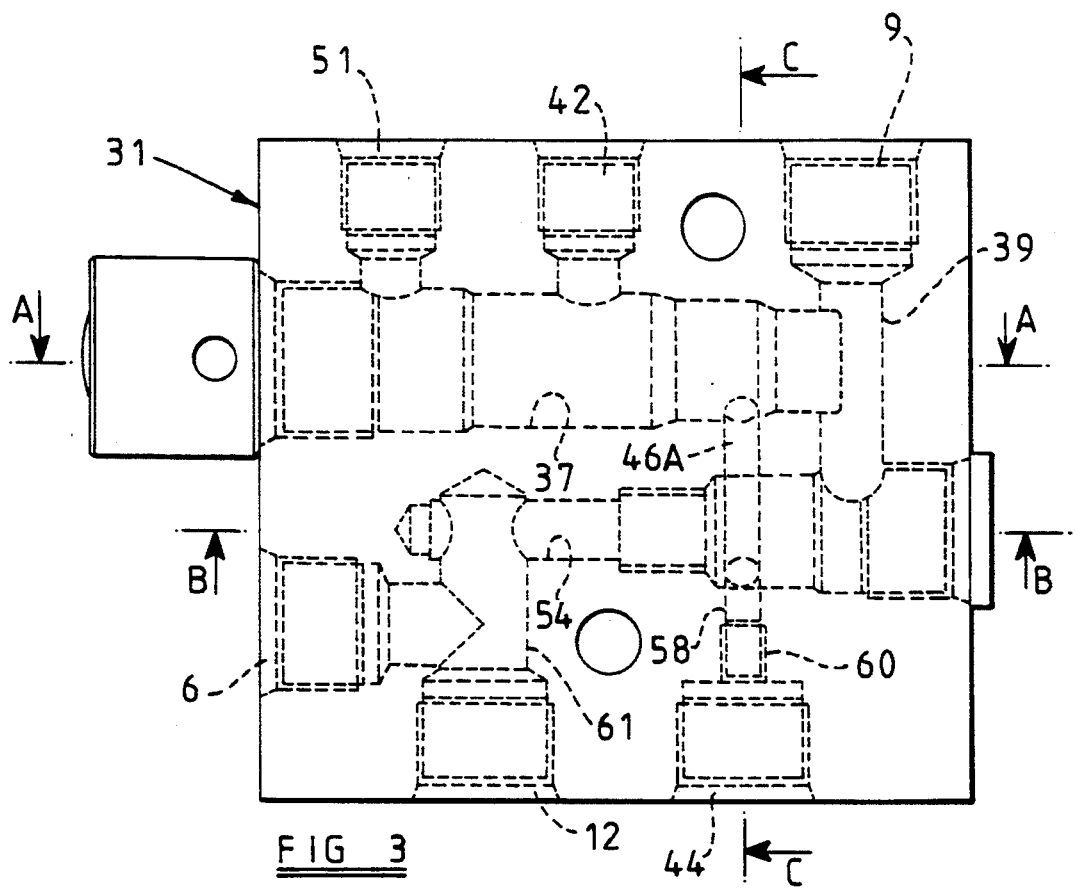
FIG. 3 is a plan view of a housing containing a switching portion of the valve assembly.
Figure 4:
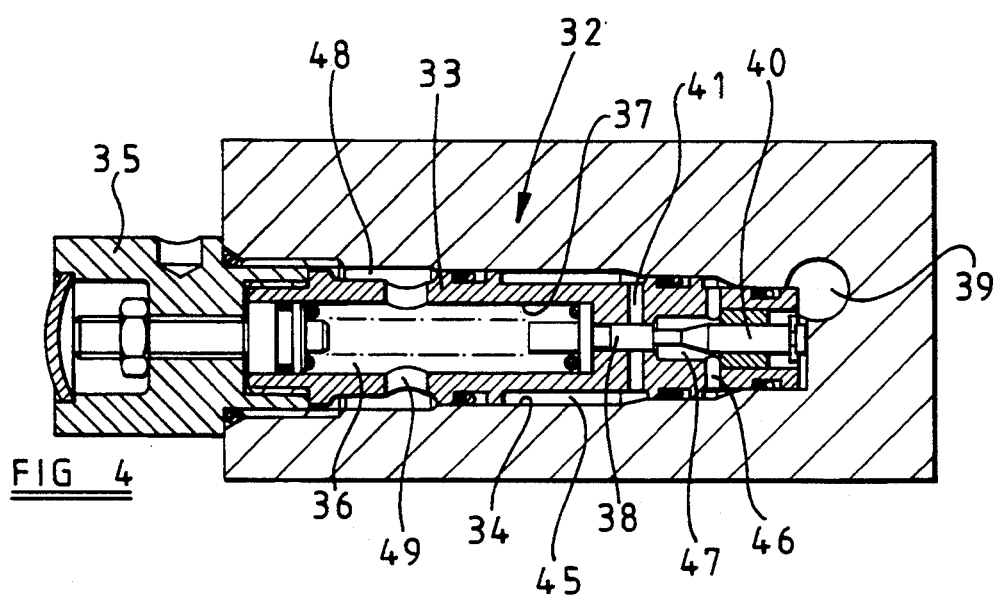
FIGS. 4, 5 and 6 are respective sections taken along the lines A—A, B—B and C—C in FIG. 3.

The switching portion 5 is formed as an integral assembly within a housing block 31, shown in FIG. 3, and includes a pilot valve 32 which is shown in longitudinal section in FIG. 4. Referring to FIG. 4 the pilot valve 32 comprises a valve body 33 held within a bore 34 by a plug 35 screwthreadedly engaged within the bore 34. A compression spring 36 is accommodated within an axial bore 37 in the valve body 33 and serves to bias a valve member 38 towards the right as seen in FIG. 4. Furthermore the accumulator pressure at the second outlet port 9 is applied by a connecting passage 39 to the end of a piston 40 so as to act on the valve member 38 in opposition to the spring pressure.

The valve member 38 is displaceable against the action of the spring 36 so as to provide fluid communication between radial passages 41 in the valve body 33 and a valve chamber 47, so as to thereby place a port 42 provided for connection to a load sensing port 43 of the power steering unit 8 in communication with an outlet port 44 by way of an annular space 45 surrounding the valve body 33 and further radial passages 46 connecting the chamber 47 with a passage 46A connected to the outlet port 44. Furthermore the axial bore 37 communicates by way of radial passages 49 with an annular space 48 surrounding the valve body 33 which itself communicates with a tank 50 by way of a tank port 51.

Figure 5:
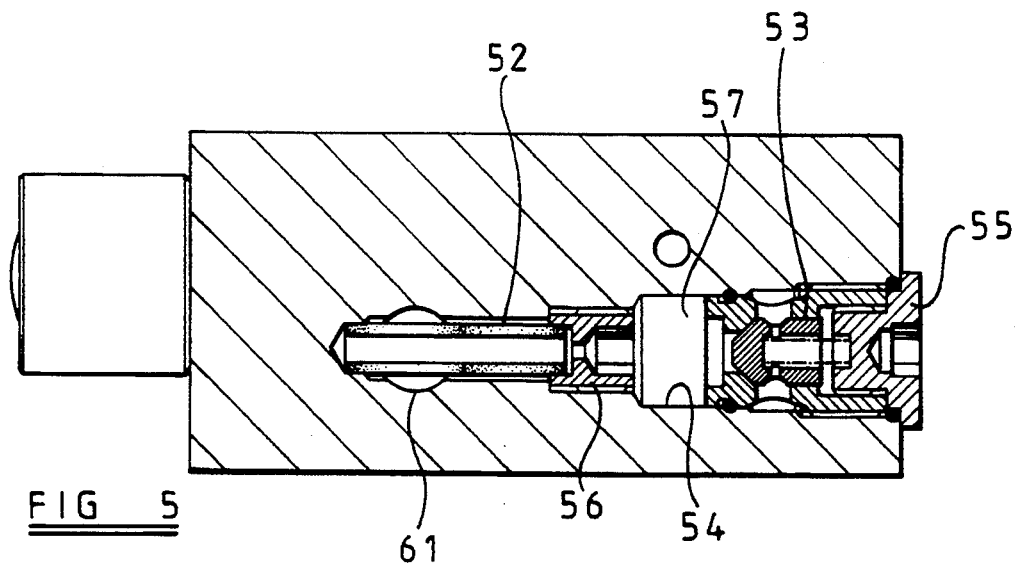
Figure 6:
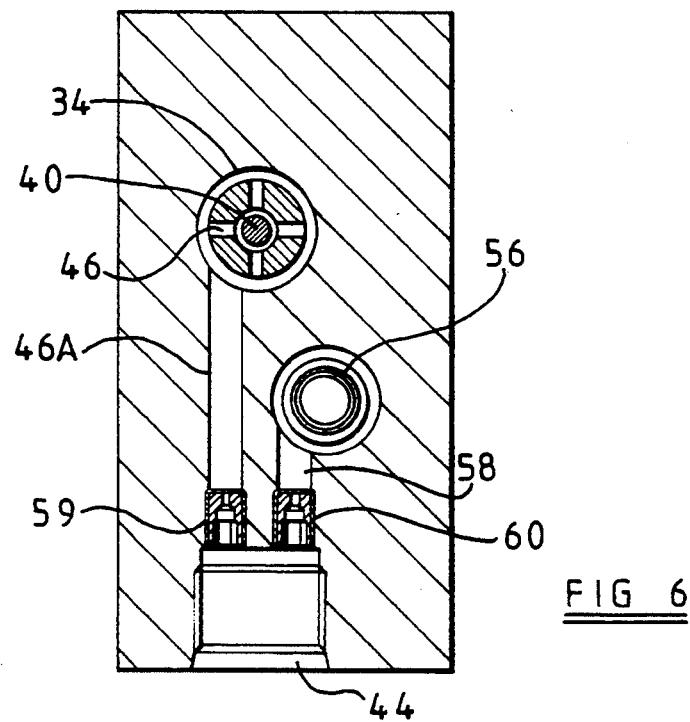

Furthermore the switching portion 5 includes a filter 52 and a check valve 53 held within a common bore 54 by a screwthreaded plug 55, as shown in FIG. 5. In addition a restriction orifice 56 is disposed within the bore 54 between the filter 52 and the check valve 53, and a chamber 57 intermediate the orifice 56 and the check valve 53 is placed in communication with the outlet port 44 by a passage 58. As shown in FIG. 6, each of the passages 46A and 58 includes a respective restriction orifice 59, 60. The filter 52 communicates with the inlet port 12 and the first outlet port 6 by way of a passage 61.

The method of operation of the flow control valve assembly 1 will now be described with reference to the schematic flow diagram of FIG. 1. At start up, if the accumulator 10 is discharged, the valve assembly 1 must first operate to charge the accumulator 10 with hydraulic fluid from the pump 4. At this stage the pilot valve 32 is in its closed position (as shown in FIG. 1) due to the action of the spring 36, and the valve member 15 of the spool valve 14 is held to the left (as seen in FIG. 1) by the spring 17. Thus the pump flow is directed to the outlet port 11 and through the inlet port 12 so as to pass by way of the check valve 53 and the second outlet port 9 to the accumulator 10. Since the pilot valve 32 is closed, no flow passes along the pilot line to the load sensing port 43 of the power steering unit 8 with the result that the pressure downstream of the orifice 56 is applied via the orifice 60 and the outlet port 44 to the right hand end of the valve member 15 of the spool valve 14, and the pressure upstream of the orifice 56 and the filter 52 is applied via the ports 12 and 11 to the left hand end of the valve member 15. The flow through the orifice 56 creates a pressure drop such that the pressure acting on the left hand end of the valve member 15 is greater than the pressure acting on the right hand end of the valve member 15, and, if the flow through the orifice 56 is high enough, this pressure difference will be sufficient to overcome the action of the spring 17 so as to cause the valve member 15 to move towards the right so as to direct at least some of the pump flow towards the excess flow port 13.

The flow rate to the accumulator 10 is therefore controlled by the orifice 56 and the loading of the spring 17 so that the valve member 15 is caused to take up a position at which a constant pressure drop across the orifice 56 is maintained. If the power steering unit 8 is operated while the accumulator 10 is charging, some of the pump flow will be bled off towards the first outlet port 6 in order to supply the power steering unit 8, and this will reduce the flow through the orifice 56, thus causing the valve member 15 to move to re-establish the flow through the orifice 56 whilst maintaining the flow to the power steering unit 8.

As the accumulator 10 is charged the pressure within the accumulator 10 rises until the pressure in the chamber 47 (see FIG. 4) acting on the valve member 38 of the pilot valve 32 is sufficient to overcome the action of the spring 36. This causes the valve member 38 to be moved towards the left as seen in FIG. 1, thereby permitting fluid flow across the valve 32 by way of the radial passages 41 and 46 and the chamber 47 (see FIG. 4) which in turn creates a pressure drop across the orifices 59 and 60. This causes the pressure in the connecting passage 39 to become greater than the pressure in the chamber 47 so that a pressure difference is produced across the piston 40 which causes the valve member 38 to be moved further towards the left.

The pilot valve 32 then remains open only so long as the pressure in the accumulator 10 acting on the right hand end of the piston 40 is sufficient to overcome the action of the spring 36. As the braking system is operated in use fluid will be drained from the accumulator 10 so that the pressure within the accumulator 10 will reduce until such time as it is insufficient to hold the pilot valve 32 open. At this time the pilot valve 32 will close the load sending line to the power steering unit 8, and the accumulator charging cycle will recommence.

The spring load divided by the cross-sectional area of the valve member 38 determines the pressure at which the pilot valve 32 opens and the cross-sectional area of the piston 40 determines the pressure at which the pilot valve 32 closes.

When the pilot valve 32 is opened in operation, the load sensing line to the power steering unit 8 is opened, and this causes the mode of operation of the valve assembly to change. Since the orifice 56 is large compared with the orifices 59 and 60, the valve assembly then functions as a load sense flow valve. In this mode the position of the valve member 15 of the spool valve 14 is controlled in dependence on the pressure at the load sensing port 43 of the power steering unit 8 which is dependent on the degree of opening of a variable orifice within the power steering unit 8, and by the relative pressure drops across the orifices 59 and 60. When fluid is demanded by the power steering unit 8, a load sensing pressure signal will be communicated to the load sensing line so as to produce pressure drops across the orifices 59 and 60 such that the valve member 15 is biased towards the left by the combined action of the spring 17 and the pressure difference across the valve member 15. This results in at least part of the pump flow being directed towards the outlet port 11 and hence towards the power steering unit 8 by way of the outlet port 6, with any excess flow being directed towards the excess flow port 13.

On the other hand, when fluid is not required by the power steering unit 8, no pressure signal is supplied to the load sensing line and hence to the right hand end of the valve member 15, so that the pressure at the outlet port 11 applied to the left hand end of the valve member 15 overcomes the pressure of the spring 17 to move the valve member 15 to the right, thus cutting off supply of fluid to the outlet port 11 and causing the pump flow to be diverted to the excess flow outlet 13.

It should be noted that the valve assembly as described above imparts several possible operating pressures to the accumulator 10. If the maximum steering pressure is greater than the accumulator charge setting, then each time that the steering pressure exceeds the accumulator pressure the accumulator will charge up to the steering pressure. The accumulator therefore operates at a minimum pressure corresponding to the pressure at which the pilot valve 32 is closed, a normal maximum pressure corresponding to the pressure at which the pilot valve 32 is opened and an upper maximum pressure corresponding to the maximum steering pressure.

In certain applications it may be required that the accumulator does not charge up to the steering pressure in which case a pressure regulator may be installed intermediate the orifice 56 and the check valve 53 so as to sense the pressure upstream of the check valve 53 and close off the supply line to the accumulator if the pressure exceeds a predetermined value.

It should be appreciated that the above described valve assembly may be varied in a number of further ways to suit particular applications. The valve assembly may be configured as described so as to have a separate flow control portion 2, which may be integral with the pump, and switching portion 5, or alternatively may consist of a single assembly either mounted on the pump or mounted remotely from the pump. If required a per se known dual accumulator charge valve may be included in the assembly for charging two accumulators. In the event of one of the accumulators or the associated braking circuit failing and losing pressure, the charge valve prevents the other accumulator from discharging, so as to provide emergency braking.

We claim:

1. A hydraulic flow control valve assembly comprising an inlet port for input fluid flow from a pump, a first outlet port for output fluid flow to a first fluid pressure actuated device, a second outlet port for output fluid flow to a second fluid pressure actuated device, an excess flow port for output fluid flow to at least one further fluid device, flow control means for controlling the fluid flow from the inlet port to the outlet ports and the excess flow port, a load sensing port for communicating a load-dependent pressure signal from the first device to the flow control means to control the flow control means so as to provide priority fluid flow to the first device, switching means for cutting off said load-dependent pressure signal from the flow control means when the pressure within the second device falls below a predetermined value so as to provide for fluid flow from the flow control means to the second device, and pressure difference sensing means for communicating the pressure difference across a restrictor, due to flow of fluid through the restrictor when fluid flow from the flow control means to the second device takes place, to the flow control means to control the flow control means so as to provide fluid flow to the second device.

2. An assembly according to claim 1, wherein the pressure difference sensing means is adapted to control the flow control means so as to allow for fluid flow to the first device as required when said load-dependent pressure signal is cut off from the flow control means by the switching means.

3. An assembly according to claim 1, wherein the assembly is formed as an integral part of a pump.

4. An assembly according to claim 1, wherein the flow control means comprises a spool valve having a valve member which is biased towards a priority flow position by a spring.

5. An assembly according to claim 4, wherein the pressure difference sensing means comprises a pressure sensing line for transmitting a pressure signal from downstream of the restrictor to one side of the spool valve member and a further pressure sensing line for transmitting a pressure signal from upstream of the restrictor to the other side of the spool valve member.

6. An assembly according to claim 1, wherein the switching means comprises a pilot valve having a valve member which is adapted to selectively open and close a load sensing line connecting the load sensing port to the flow control means.

7. An assembly according to claim 6, wherein the valve member is biased towards a closed position by a spring and is adapted to be moved to an open position against the action of the spring when the pressure within the second device exceeds a preset value.

8. An assembly according to claim 7, wherein the pilot valve is adapted to open when the pressure within the second device is at a first value and to close when the pressure within the second device is at a second value greater than the first value.

9. An assembly according to claim 6, wherein the pressure difference sensing means includes a check valve intermediate the restrictor and the second outlet port in order to prevent fluid flow from the second device towards the restrictor.

10. An assembly according to claim 9, wherein the pilot valve and the check valve are provided within a common housing.

* * * * *